United States Patent [19]

Stepien, Jr. et al.

[11] 4,041,712

[45] Aug. 16, 1977

[54] METHOD FOR REDUCING WATER LOSS THROUGH SOIL BY SEEPAGE

[75] Inventors: George Stepien, Jr., Montclair, N.J.; Frank L. Califano, deceased, late of Hackensack, N.J.; William DeLorenzo, Jr., co-executor; G. Bruce Gillard, co-executor, both of Hackensack, N.J.; Thomas E. Russell, deceased, late of Whippany, N.J.; by Florence P. Russell, executrix, Whippany, N.J.

[73] Assignee: The Flintkote Company, Stamford, Conn.

[21] Appl. No.: 577,209

[22] Filed: May 14, 1975

Related U.S. Application Data

[60] Continuation-in-part of Ser. No. 457,969, April 4, 1974, Pat. No. 3,891,586, which is a division of Ser. No. 296,114, Oct. 10, 1972, Pat. No. 3,831,382.

[51] Int. Cl.$^2$ .............................................. E02D 3/14
[52] U.S. Cl. .................................... 61/36 R; 61/1 R; 61/36 D; 106/277; 260/28.5 AS
[58] Field of Search ................... 61/1 R, 36 R, 36 D; 106/277; 260/28.5 AS

[56] References Cited

U.S. PATENT DOCUMENTS

| 3,276,887 | 10/1966 | Pitchford | 106/277 |
|---|---|---|---|
| 3,359,738 | 12/1967 | Dybalski et al. | 61/1 R |
| 3,650,113 | 3/1972 | Ferm | 61/36 R |
| 3,721,043 | 3/1973 | Van Deerne | 61/36 R |
| 3,891,586 | 6/1975 | Califano et al. | 260/28.5 AS |

*Primary Examiner*—Paul R. Gilliam
*Assistant Examiner*—Alex Grosz
*Attorney, Agent, or Firm*—DeLio and Montgomery

[57] ABSTRACT

A composition and method for reducing the loss of liquids by seepage through permeable ground surfaces is shown. The composition comprises an aqueous emulsion of asphalt including a cationic emulsifier, a non-ionic surface active agent and elastomer solids. The compositions are particularly adapted for application to agricultural soils. After application to the ground surface, the surface is flooded with water to force the aqueous emulsion downward into the subsurface. A semi-permeable fluid barrier is created several inches below the surface. The composition and method are useful to create subsurface liquid barriers which permit the surface soil to be used for agricultural purposes.

5 Claims, No Drawings

METHOD FOR REDUCING WATER LOSS THROUGH SOIL BY SEEPAGE

This application is a continuation-in-part of copending application Ser. No. 457,969, filed April 4, 1974, now U.S. Pat. No. 3,891,586 which application is a divisional application of Ser. No. 296,114, filed Oct. 10, 1972, now issued as U.S. Pat. No. 3,831,382.

BACKGROUND AND OBJECTS OF THE INVENTION

This invention relates broadly to a composition and to a method for reducing the loss of water through permeable ground surfaces. Even more specifically, this invention relates to a composition having the properties of a binder such that when applied by the method of this invention to ground soils or sands, a strong, semipermeable and flexible barrier is created below the surface. Even more specifically, this invention relates to a process for sealing the subsurface of porous agricultural lands so that they retain water and are more productive.

In many agricultural areas, water is a raw material of very considerable value. Particularly, in areas having little rainfall and no access to a ready supply of water, it is important that the water used for agricultural purposes not be immediately lost from the surface areas of the soil, through percolation to lower strata. In arid areas such as in the Western and Southwestern areas of the United States, where soils tend to be sandy and of a very porous and permeable nature, much of the available water supplies are lost due to seepage through the surface strata and accordingly the land cannot be used economically to grow crops.

While several methods have been developed in the art for impermeabilizing and consolidating ground soils as for example coating the ground surface with gunnite or waterproofing the ground surfaces with sheets of vinyl polymeric material or laying down other pavements of asphalt, these techniques are not suitable for impermeabilizing a lower strata of the soil, so as to retain the surface strata in a free, loose and agriculturally acceptable condition. The methods and compositions taught in grandparent application Ser. No. 457,969, now U.S. Pat. No. 3,891,586 and parent application Ser. No. 296,114, now U.S. Pat. No. 3,831,382 are eminently suitable for sealing and impermeabilizing surface strata and likewise the improved compositions and methods taught in copending application Ser. No. 566,283, filed April 9, 1975, now U.S. Pat. No. 3,979,916, are eminently suitable for sealing the surface strata.

The primary purpose of the instant invention is to provide a method and composition whereby agricultural soils can be treated so as to form a semi-pervious barrier at a selected depth below the surface, so that the surface soil remains loose and of the proper consistency for nurturing the roots of various plants. The sub-surface barrier must be semi-pervious because it is necessary that the surface soil drain, in order not to rot the roots of the growing plants. The sub-surface barrier created by the composition and methods of this invention permit either natural moisture or moisture from irrigation to be retained in the top strata of the soil for longer periods of time and thereby permit the plants to absorb water for biological processes. A further purpose of the instant invention is to reduce the waste of artificial nutrients and fertilizers which is inevitable where crops are grown in very porous soils and the nutrients drain with the irrigation or natural water past the roots and to lower levels where they are lost. A major problem in arid areas is not only the loss of the nutrient values by percolation through the soil, but also the runoff at lower strata of the fertilizer-bearing waters into estuaries and streams and the contamination of those streams with the phosphate, nitrate or other nutrient salts.

Other workers have attempted to create sub-surface, semi-pervious barriers, but these earlier methods have been largely inefficient, uneconomic or technically difficult to carry out. One method includes that of stripping the top soil from a given area and then constructing a water retaining barrier and thereafter recovering the stripped area with top soil. The large amount of work and expense inherent in this system is apparent.

Still another method has been developed wherein a specially designed auger is provided which creates an undercut slot below the surface, at a selected depth. Simultaneously while creating the slot, the auger sprays a liquid asphaltic media into the soil. The disadvantage of this technique is that special expensive equipment must be designed and the barrier which is produced is uneven and may therefore be more permeable than desired.

It is thus the primary object of this invention to provide a composition and method whereby a substratum, semipermeable barrier can be created at a selected depth beneath the surface of porous soils so as to make these soils useful for agricultural purposes.

It is a related object of this invention to provide a composition and method which is inexpensive and efficient to use and which will create a reliable barrier below the root levels of plants and will leave the surface soils in a loose condition so as not to interfere with the development of the growing plants.

It is a related object of this invention to decrease the loss of fertilizer and nutrients through percolation of same through ground soils and to decrease the pollution of streams and estuaries through sub-surface runoff of these nutrients and fertilizers.

THE INVENTION IN SER. NO. 457,969, NOW U.S. PAT. NO. 3,891,586

In parent application Ser. No. 457,969, now U.S. Pat. No. 3,891,586, compositions and methods are disclosed for sealing the surface layers of porous soils. A composition is disclosed which acts as a binder and penetrates and binds together the particles in permeable ground sand and soils so as to form a tough, flexible waterproofing mass. The composition disclosed in Ser. No. 457,969, now U.S. Pat. No. 3,891,586, in its broadest embodiment, comprises an aqueous emulsion of a water insoluble and water dispersible bituminous material in which the bituminous material comprises from 25 to 50% by weight of the emulsion. The bituminous material is present in the emulsion in particles at least 90% of which have a size of less than about 10 microns and is kept in stable cationic emulsion by means of a mixture of cationic emulsifiers comprising from approximately 0.3% to 1.2% by weight of the emulsion. The properties of the emulsion particularly its "break" characteristics are desirably modified and tailored for the purposes of sealing the ground surface by inclusion of from 0.1 to 0.5% of the emulsion of a nonionic surface active agent. The overall composition additionally contains an acid in an amount sufficient to control the pH of the composition in the range of approximately 3 to 7.

the compositions disclosed in Ser. No. 457,969, now U.S. Pat. No. 3,891,586 are applied onto a ground surface and as described more fully hereinbelow, the composition penetrates the ground surface to a depth of as much as four inches or more and forms a binder which binds and consolidates into a mass the particles which comprise the ground surface. It has been found that the compositions can be applied directly to dry soils and that the waterproofing composition which is deposited forms a tough, permanent and flexible structure on steep terrain as well as flat terrain and reduces water seepage by 95% or more. The compositions have been found to set in as little as four hours.

In order to achieve the penetration of a substantial depth of the soil or sand in the bottom and at the sides of a natural or man-made body of water, it is necessary to carefully control the "break" of the cationic emulsions in the presence of the siliceous ground material whose particles are known to have negatively charged surface characteristics. As is well known in the art of cationic bituminous emulsions, the dispersed particles of bitumen are suspended in the water by means of cationic emulsifying agents. The non-polar portion of the organic cation is readily solubilized in the particle of bitumen whereas the polar end thereof extends into the aqueous medium. The uniformity of orientation of the cationic emulsifier within the particles of bitument creates a uniform suspension. When these particles come into contact with solid mineral surfaces, which are negatively charged, the forces of attraction contribute to a strong adsorption of the particles of bitumen on the mineral surfaces and thus lead to adhesion of bitumen and soil particles. In order to avoid a breakdown of the emulsion at the moment of contact with solid surfaces, a mixture of cationic emulsifiers having different properties are used. A still further adjustment to the stability of the emulsion is achieved by adding to it a quantity of a nonionic surface active agent. The surface active agent wets the particles of sand or soil and reduces the reactivity of them with the emulsion. The nonionic surface active agent can be deemed a coemulsifier and it performs the dual functions of wetting and activating the surfaces of the solids and modifying and suppressing the breakpoint of the cationic emulsions.

The cationic emulsifiers are those which are known in the art as being effective for forming stable, oil-in-water emulsions of bituminous compounds. These basic emulsifiers are aliphatic amine compounds, more specifically, aliphatic diamine compounds. The compounds are typically employed in the form of a water soluble salt which is obtained by reacting the diamine with a suitable inorganic acid such as hydrochloric acid. Preferred basic emulsifiers are selected from the group consisting of N-alkyl polymethylene diamines of the formula

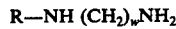

R—NH (CH$_2$)$_w$NH$_2$ where $w$ is an integer of from 2 to 4 and R represents an aliphatic hydrocarbon containing from 8 to 22 carbon atoms. The preferred species, marketed under the trade name DUOMEEN T by Armak Chemical Division of Akzona Corporation, 110 North Wacker Drive, Chicago 6, Ill. is comprised of a tallow diamine having the formula R—NH(CH$_2$)$_3$NH$_2$.

A second cationic emulsifier is used, which can be characterized as an emulsification aid and emulsion break suppressant. It is a compound selected from the group consisting of alkyl quaternary ammonium compounds of the formula

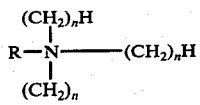

where $n$ is from 1 to 2 and R represents an aliphatic hydrocarbon containing from 8 to 22 carbon atoms. An emulsification aid which has been found to have suitable properties is a tallow trimethylolammonium chloride sold under the trademark ARQUAD S-50 by the Armak Chemical Division of Akzona. The quaternary ammonium compounds, like the diamines are typically used in their salt forms.

Other compounds which may be useful to control the break stability of the emulsions are the n-alkyl polymethylene mono- and poly-alkoxylated diamines

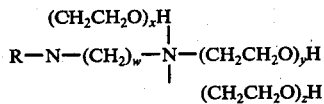

where $w$ is an integer of from 2 to 4, $x$, $y$, and $z$ are integers of from 0 to 20 and the total of $x$, $y$, and $z$ does not exceed 20.

When applying both a basic emulsifier and an emulsification aid-break suppressant as in parent application Ser. No. 457,969, it has been found that best results are obtained if the total amount of emulsifier is between 0.3 percent and 1.2 percent by weight of the emulsion. The ratio of the basic emulsifier to the emulsification aid may be in the range of from 1:2 to 2:1.

The non-ionic surface active agent performs a relatively complex function which is not entirely understood. One of its functions particularly where the soil or sand is dry, is to wet the surface of the solid particles and activate the ions inherent therein. A second function is to modify and suppress the break point of the cationic emulsion by regulating the reactivity of the bituminous emulsionsiliceous solid reaction system which is obtained when the composition is sprayed on a ground surface. A number of different nonionic surface active agents can be used, however, the preferred species are those selected from the group consisting of alkyl aryl polyether alcohols, polyethoxylated nonylphenols (average ethylene oxide content of 4–12 mols per mol of nonyphenyl) benzyl ethers of octyl phenyl and linear organic alcohols. Suitable commercial products are TRITON CF-10, a benzyl ether of octylphenolethylene oxide adduct, manufactured by Rohm and Haas Co., Philadelphia, Pa., NOPCOWET 160, a nonionic, alkyl aryl polyether alcohol, manufactured by Nopco Chemical Division, Diamond Shamrock Chemical Company, Morristown, New Jersey and HYONIC PE-90 a polyethoxylated nonyphenol containing 9 mols of ethylene oxide per mol of nonylphenol, manufactured by Nopco Chemical Division of Diamond Shamrock Chemical Co., Morristown, N.J. As in the case with the cationic emulsifiers, the particular surface active agent chosen and the amount used may depend in part on the nature of the soil to be impermeabilized. However, it was found that good results were obtained if the total amount of the surface active agent was from approximately 0.1 to 1.5 percent by weight of the emulsion.

It was also found that improved results were obtained if the composition contained, in addition to the bituminous emulsion, the cationic emulsifiers and nonionic surface active agent, an emulsified elastomeric solid such as latex in an amount of from 1 to 10 percent by weight of the emulsion. The rubber solids may have a particle size of less than about 10 microns, and are kept in emulsion by the same active components as are useful for emulsifying the bitumen. Among the commercially available rubbers used to advantage are PLIOPAVE L 165-K and NEOPRENE 950. PLIOPAVE L 165-K is the trademark of the Goodyear Tire and Rubber Co. and identifies their cationic styrene-butadiene rubber latex comprising 60% rubber solids. NEOPRENE 950 is the trademark of the duPont Company and identifies their cationic chloroprene rubber latex comprising 50% solids.

The seal obtained where the compositions contain rubber solids is tougher and more flexible than where the rubber solids are not used. Inclusion of the rubber solids is recommended in areas where earth tremors or shifts in the strata are anticipated and the flexibility of the sealant mass is more important. It has been found that if less than one percent by weight of rubber solids are used, the advantages in the overall composition are not realized and where more than 10 percent rubber solids are used, no substantial additional advantages are achieved.

In addition to the aforedescribed components of the composition, an acid, preferably an inorganic acid such as hydrochloric acid or phosphoric acid is included. The amount of the acid used should correspond to that required to achieve a pH of the overall composition of from 3 to 7 or slightly less than 7 in order to establish an acidity which will insure the reactivity of the bitumen particles with the surface of the soil or sand particles which have a negatively charged characteristic. Typically the acid is used in from 0.1 to 1.0 percent of the emulsion. It has been found that best results are obtained if the pH is controlled in the range from 5 to 7.

Other modifying agents may be added to the composition to stabilize the emulsion for storage or transport. As is known, for example, minor proportions of an alkali or alkaline earth metal salt such as calcium chloride or sodium chloride may be added to lengthen the life of the emulsion. Typically these components are added in from 0.01 percent to 1.0 percent by weight of the emulsion.

The bituminous materials that may be used to form the emulsions are well known in the art. They may be selected, broadly, from water-insoluble, water-dispersible, organic thermoplastic bituminous substances that are normally solid, semi-solid or viscous liquids at ordinary atmospheric temperatures. Examples of these materials are petroleum and native asphalts, pyrogenous residues, such as blown petroleum asphalts, sludge asphalts, pressure tars and pitches. Of these materials, petroleum asphalt is more commonly used and it may be produced to the desired physical properties of softening point (Ball & Ring) from 90° F. to 200° F. and penetration from 4 dmm to 205 dmm (at 77° F.) by steam refining, by air-blowing, by solvent extraction methods, or by a combination of such methods.

Methods for forming stable emulsions of the bituminous substance in water as well known in the art. Typically, emulsions are prepared in concentrated form and contain about 65% solids. The emulsions are prepared by conventional methods as for example by first forming a solution of water, basic emulsifier, emulsification aid, acid and any other additives, together with rubber solids at about 120° F. This solution and molten asphalt at about 280° F. are then pumped simultaneously from separate vessels into a Charlotte Colloid Mill or other high shear pressurized mill wherein the asphalt is subjected to high shear forces and is broken up into small particles. The particle sizes in the finished emulsions may be broadly from 1 to 50 microns, but best results are obtained where ninety percent or more of the particles are less than 10 microns. Methods for forming the emulsions are extensively described in the art.

Although emulsions are typically prepared in more concentrated form, it has been found that good penetration of the surface material is obtained only where the solid content of the emulsion is in the range of 25 to 50 percent. The preferred solids concentration is 30 to 40 percent by weight.

The composition is applied to the walls and bed of water containment structures such as reservoirs, streams, ponds, irrigation ditches, canals and the like. The composition is preferably but not necessarily applied to the surface by spraying with a pole gun connected to a pump. The compositions may be applied to the surface soil in from 4 to 40 gallons per 100 square feet of surface. Desirably the spray is applied in from 10 to 20 gallons per 100 square feet of surface.

It has been found that particularly good results are obtained if the ground surface is first wet with water or preferably with a solution of nonionic surfactant in the range of 0.5 to 2.0 percent by weight of solution. Wetting the ground surface with water or surfactant solution compacts the soil particles closer to one another and prepares it advantageously for the asphalt emulsion. If a minor amount of the nonionic surface active agent is included in the water solution, the particles of sand or rock are more effectively wetted and this permits the subsequent emulsion or "wick" into the ground so that a deeper penetration is obtained. Penetrations of as much as 1 to 4 inches have been obtained with treatments following this technique. Depending on the nature of the soil to be waterproofed, it may be desirable to include a minor amount of acid in the pre-wetting step to further activate the negative surfaces of the siliceous ground material. Although not critical, it has been found that best results are obtained if the soil to be impermeabilized is first wet with approximately 50 to 100 gallons of water or solution per 100 square feet of surface.

DESCRIPTION OF THE INVENTION AND PREFERRED EMBODIMENT

It has now been found that semi-permeable sub-surface barriers can be efficiently created without damaging the surface strata, by applying a composition consisting essentially of an aqueous asphalt emulsion and a binary emulsifier system comprising a cationic emulsifier and a nonionic emulsifier.

The bituminous materials that are used to form the emulsions are known in the art and are disclosed above and in parent application Ser. No. 457,969, now U.S. Pat. No. 3,891,586. The cationic emulsifier is preferably a compound selected from the group consisting of alkyl quaternary ammonium compounds as are disclosed above and in the parent application but other cationic emulsifiers as are disclosed above can also be employed as can anionic emulsifiers such as the sodium or potassium soaps of long chain fatty acids. Likewise, the nonionic surface active agents used as emulsifiers are those disclosed above and in the parent application, the preferred species being those selected from the group consisting of alkyl aryl polyether alcohols, polyethoxylated nonylphenols (average ethylene oxide content of 4–12 mols per mol of nonylphenol), benzyl ethers of octyl phenol and linear organic alcohols. Desirably, the composition contains, in addition to the bituminous emulsion and the nonionic and cationic emulsifiers, an emulsified elastomeric solid such as latex in an amount of from 1 to 10% by weight of the emulsion, as disclosed above and in the parent application. Lastly, the emulsion may contain modifying agents, salts, acids, and the like as are disclosed above.

The emulsions suitable for use in forming sub-surface barriers may contain broadly from 15 to 50% by weight of bituminous materials. The cationic emulsifier is preferably employed in from 0.15% to 1.25% by weight of the emulsion. The nonionic emulsifier is preferably used in from 3% by weight of emulsion to about 7.5% by weight and is desirably used in the range of from 4.0% to 6.0% by weight of the emulsion. The nonionic emulsifier is thus used in a quantity somewhat greater than that necessary to function as a strata-wetting agent and emulsion break suppressant, but is used in amounts slightly less than that necessary to act as the singular emulsifier.

The composition of this invention is deposited on the surface of the soil by any suitable mechanical means including spray devices and the like. The surface of the soil is thereafter promptly flooded with water to force the emulsion below the surface. The quantity of water used for the flooding may vary depending upon the porosity of the soil and the predetermined desired depth for formation of the sub-surface, semi-permeable barrier. Typically, for agricultural purposes, the flooding water is used in from 10 gallons to 40 gallons per 100 square feet of surface area.

It has been found that using the compositions of this invention and the methods, that sub-surface barriers can be effectively created at depths from 3 inches to 6 inches below the surface of the soil and that the surface of the soil is not disturbed. The compositions and methods can be used in other applications as well, such as forming barrier films within thick-felted or woven fibers, mats or sheets or to form a barrier within a thick porous structure such as a concrete wall or floor or to create a sub-surface barrier below the standard construction base for pavements or highways.

The sub-surface barrier formed according to the instant invention has still other related advantages insofar as it acts as a heat absorber which is beneficial for nurturing growing root structures. The semi-pervious barriers can be used to temporarily impound liquid fertilizer solution thereby creating a partial aqua-culture environment for growing crops.

As disclosed in the parent application and above, good results may be obtained if the ground surface is first wet with water or preferably with solution of nonionic surfactant.

In the following Examples, Examples I–IV are representative of the methods and compositions disclosed in parent application Ser. No. 457,969 now U.S. Pat. No. 3,891,586. Examples V, VI and VII are representative of the methods and compositions of this invention, but are not meant to limit the scope of the claims.

EXAMPLE I

The degree to which composition disclosed in parent application Ser. No. 457,969 now U.S. Pat. No. 3,891,586 reduce the rate of water loss from sandy soils was determined in a series of tests using different compositions. The compositions were prepared by premixing the emulsifiers and other adjuvants in water in approximately 120° F. and pumping the solution together with molten asphalt at 280° F. to a colloid mill for emulsification. The components of the compositions are identified below.

Asphalt-Binder B — Shell Oil Co.
   100–120 Penetration at 77° F.
   Soft Point R&B, 108—118° F.
   Ductility at 77° F. at 5 cm/min.-100 cm (minimum)
Duomeen T - N alkyltrimethylene diamine — Armak Chemical Division
Arquad S-50 - N alkyl quaternary ammonium compound — Armak Chemical Division
Pliopave L-165-K - Cationic styrene-butadiene rubber latex - (60% solids) — Goodyear
Neoprene 950 - Cationic Chloroprene rubber latex- (50% solids) — duPont The compositions were applied to the surface of a sandy soil retained in 1 foot square plastic boxes. Each test box contained a 4 inch depth of test sand supported over a one inch layer of 1 inch stones which were separated from the sand by a mesh screen. A 2 inch square hole was cut in the bottom of the box to allow for runout and the boxes were suspended above the floor so that the holes in their bottoms would not be occluded. The time of water retention for the boxes treated with the composition was compared with the time of water retention in a control box of untreated sand. The time of water retention in the control box was approximately 2 to 3 minutes whereas the sand in the boxes treated with compositions ranged from 90 to 11,520 minutes. The results are expressed both in water retention times and in terms of percentage water loss reduction. The latter figures are the more meaningful ones since it is the parameter adopted by governmental agencies to determine the effectiveness of impermeabilizing treatments.

The results achieved with a variety of compositions are set forth below in Table I.

TABLE I

| COMPOUND | Control | A | A-1 |
|---|---|---|---|
| Asphalt (Binder B) | | 5200 | 5200 |
| Water | | 2800 | 2800 |
| Duomeen T | | 16 | 32 |
| Arquad S-50 | | | |
| *HCL | | 8 | 8 |
| CaCl$_2$ | | 4 | 4 |
| Neoprene Latex 950 (50%) | | | |
| Pliolite Latex 160 (49%) | | | |
| Ucar Latex 893 (50%) | | | |
| Rhoplex Latex HA-12 (45%) | | | |
| Pliolite Latex 5352 (68%) | | | |
| Hycar Latex 1562 × 103 (41%) | | | |
| Pliopave Latex L165-K (63%) | | | |
| Emulsification | | Good | Good |
| Smoothness | | Fairly Smooth | Smooth |
| Particles | | Slight Grit | None |
| Settlement | | None | None |
| Concentration of Bituminous Solids (wgt %) | | 65% | 65% |
| Penetration | | 0.5" | 1.0–2.0" |
| Time of H$_2$O Retention (Min.) for 1 Gal. | 2-¾ | 600 | 2400 |
| Percolation Rate Gals/Min. | .3636 | .00166 | .00042 |
| % Water Loss Reduction | | 99.45 | 99.89 |
| COMPOUND | A-1' | B | C |

TABLE I-continued

| | | | |
|---|---|---|---|
| Asphalt (Binder B) | 5200 | 5200 | 5200 |
| Water | 5500 | 2800 | 10800 |
| Duomeen T | 32 | 16 | 8 |
| Arquad S-50 | | 16 | 40 |
| *HCL | 8 | 8 | 8 |
| CaCl₂ | 4 | 4 | 4 |
| Neoprene Latex 950 (50%) | | | |
| Pliolite Latex 160 (49%) | | | |
| Ucar Latex 893 (50%) | | | |
| Rhoplex Latex HA-12 (45%) | | | |
| Pliolite Latex 5352 (68%) | | | |
| Hycar Latex 1562 × 103 (41%) | | | |
| Pliopave Latex L165-K (63%) | | | |
| Emulsification | Good | Good | Good |
| Smoothness | Smooth | Very Smooth | Very Smooth |
| Particles | None | None | None |
| Settlement | None | None | None |
| Concentration of Bituminous Solids (wgt %) | 48.75% | 65% | 32.5% |
| Penetration | 0.5–1.5" | 0.5" | 1" |
| Time of H₂O Retention (Min.) for 1 Gal. | 11520+ | 90 | 132 |
| Percolation Rate Gals/Min. | .000086 | .01110 | .00757 |
| % Water Loss Reduction | 99.97 | 97.00 | 97.79 |

| COMPOUND | B' | H-1 | H-1' |
|---|---|---|---|
| Asphalt (Binder B) | 5200 | 5200 | 5200 |
| Water | 10800 | 2400 | 10800 |
| Duomeen T | 16 | 16 | 16 |
| Arquad S-50 | 16 | | |
| *HCL | 8 | 8 | 8 |
| CaCl₂ | 4 | 4 | 4 |
| Neoprene Latex 950 (50%) | | 800 | 800 |
| Pliolite Latex 160 (49%) | | | |
| Ucar Latex 893 (50%) | | | |
| Rhoplex Latex HA-12 (45%) | | | |
| Pliolite Latex 5352 (68%) | | | |
| Hycar Latex 1562 × 103 (41%) | | | |
| Pliopave Latex L165-K (63%) | | | |
| Emulsification | Good | Good | Good |
| Smoothness | Very Smooth | Fairly Smooth | Fairly Smooth |
| Particles | None | Slight Grit | Slight Grit |
| Settlement | None | None | None |
| Concentration of Bituminous Solids (wgt %) | 32.5% | 65% | 31% |
| Penetration | 1" | 0.5" | 0.5" |
| Time of H₂O Retention (Min.) for 1 Gal. | .90 | 260 | 150 |
| Percolation Rate Gals/Min. | .01110 | .00384 | .00666 |
| % Water Loss Reduction | 97.00 | 98.95 | 98.07 |

| COMPOUND | H-1a | H-1b | H-2 |
|---|---|---|---|
| Asphalt (Binder B) | 5200 | 5200 | 5200 |
| Water | 2560 | 2560 | 2384 |
| Duomeen T | 32 | 32 | 16 |
| Arquad S-50 | | | 16 |
| *HCL | 8 | 8 | 8 |
| CaCl₂ | 4 | 4 | 4 |
| Neoprene Latex 950 (50%) | 480 | 480 | |
| Pliolite Latex 160 (49%) | | | 816 |
| Ucar Latex 893 (50%) | 893 (50%) | | |
| Rhoplex Latex HA-12 (45%) | | | |
| Pliolite Latex 5352 (68%) | | | |
| Hycar Latex 1562 × 103 (41%) | | | |
| Pliopave Latex L165-K (63%) | | | |
| Emulsification | Good | Good | N.G. |
| Smoothness | Smooth | Smooth | |
| Particles | None | None | |
| Settlement | None | None | |
| Concentration of Bituminous Solids (wgt %) | | | |
| Penetration | | | |
| Time of H₂O Retention (Min.) for 1 Gal. | | | |
| Percolation Rate Gals/Min. | | | |
| % Water Loss Reduction | | | |

| COMPOUND | H-3 | H-4 | H-4a |
|---|---|---|---|
| Asphalt (Binder B) | 5200 | 5200 | 5200 |
| Water | 2400 | 2312 | 2518 |
| Duomeen T | 24 | 16 | 24 |
| Arquad S-50 | | | 16 |
| *HCL | 8 | 8 | 8 |
| CaCl₂ | 4 | 4 | 4 |
| Neoprene Latex 950 (50%) | | | |
| Pliolite Latex 160 (49%) | | | |
| Ucar Latex 893 (50%) | 800 | | |
| Rhoplex Latex HA-12 (45%) | | 888 | 533 |
| Pliolite Latex 5352 (68%) | | | |
| Hycar Latex 1562 × 103 (41%) | | | |
| Pliopave Latex L165-K (63%) | | | |
| Emulsification | | Poor | N.G. | N.G. |
| Smoothness | | | | |
| Particles | | | | |
| Settlement | | | | |
| Concentration of Bituminous Solids (wgt %) | | | | |
| Penetration | | | | |
| Time of H₂O Retention (Min.) for 1 Gal. | | | | |
| Percolation Rate Gals/Min. | | | | |
| % Water Loss Reduction | | | | |

| COMPOUND | H-5 | H-6 | H-7 |
|---|---|---|---|
| Asphalt (Binder B) | 5200 | 5200 | 5200 |
| Water | 2614 | 2224 | 2560 |
| Duomeen T | 16 | 16 | 24 |
| Arquad S-50 | | | 16 |
| *HCL | 8 | 8 | 8 |
| CaCl | 4 | 4 | 4 |
| Neoprene Latex 950 (50%) | | | |
| Pliolite Latex 160 (49%) | | | |
| Ucar Latex 893 (50%) | | | |
| Rhoplex Latex HA-12 (45%) | | | |
| Pliolite Latex 5352 (68%) | 584 | | |
| Hycar Latex 1562 × 103 (41%) | | 976 | |
| Pliopave Latex L165-K (63%) | | | 640 |
| Emulsification | N.G. | N.G. | Good |
| Smoothness | | | |
| Particles | | | Some Grit |
| Settlement | | | |
| Concentration of Bituminous Solids (wgt %) | | | 62% |
| Penetration | | | 1" |
| Time of H₂O Retention (Min.) for 1 Gal. | | | 1320 |
| Percolation Rate Gals/Min. | | | .00075 |
| % Water Loss Reduction | | | 99.72 |

| COMPOUND | H-8 | H-9 | H-10 |
|---|---|---|---|
| Asphalt (Binder B) | 5200 | 5200 | 5200 |
| Water | 2320 | 2560 | 2652 |
| Duomeen T | 24 | 16 | 16 |
| Arquad S-50 | 16 | 16 | 16 |
| *HCL | 8 | 8 | 8 |
| CaCl₂ | 4 | 4 | 4 |
| Neoprene Latex 950 (50%) | | 480 | |
| Pliolite Latex 160 (49%) | | | |
| Ucar Latex 893 (50%) | | | |
| Rhoplex Latex HA-12 (45%) | | | |
| Pliolite Latex 5352 (68%) | | | |
| Hycar Latex 1562 × 103 (41%) | | | |
| Pliopave Latex L165-K (63%) | 1280 | | 384 |
| Emulsification | Poor | Good | Good |
| Smoothness | | Smooth | Smooth |
| Particles | | None | None |
| Settlement | | None | None |
| Concentration of Bituminous Solids (wgt %) | | 63% | 63% |
| Penetration | | 0.5–1.0" | 0.5" |
| Time of H₂O Retention (Min.) for 1 Gal. | | 600 | 11520 |
| Percolation Rate Gals/Min. | .00166 | .000086 | |
| % Water Loss Reduction | | 99.45 | 99.97 |

| COMPOUND | H-9' | H-10' |
|---|---|---|
| Asphalt (Binder B) | 5200 | 5200 |
| Water | 5400 | 5500 |
| Duomeen T | 16 | 16 |
| Arquad S-50 | 16 | 16 |
| *HCL | 8 | 8 |
| CaCl₂ | 4 | 4 |
| Neoprene Latex 950 (50%) | 480 | |
| Pliolite Latex 160 (49%) | | |
| Ucar Latex 893 (50%) | | |
| Rhoplex Latex HA-12 (45%) | | |
| Pliolite Latex 5352 (68%) | | |
| Hycar Latex 1562 × 103 (41%) | | |
| Pliopave Latex L165-K (63%) | | 384 |
| Emulsification | Good | Good |
| Smoothness | Smooth | Smooth |
| Particles | None | None |
| Settlement | None | None |
| Concentration of Bituminous Solids (wgt %) | 47% | 47% |
| Penetration | 0.5–0.75" | 0.75–1.50" |
| Time of H₂O Retention (Min.) for 1 Gal | 1320 | 2880 |
| Percolation Rate Gals/Min. | .00075 | .00034 |
| % Water Loss Reduction | 99.72 | 99.89 |

EXAMPLE II

A field application of the compositions and methods disclosed in parent application Ser. No. 457,969 was conducted in Pauma Valley, Calif. A composition was formed by combining three parts of a concentrated cationic emulsion with one part of a relatively dilute emulsion of latex solids in water. The concentrated asphalt emulsion had the following composition:

Example

| Component A | % by weight |
| --- | --- |
| Asphalt (Binder B) | 64.58 |
| Water | 34.80 |
| Duomeen T | .29 |
| Arquad S-50 | .19 |
| HCl | .095 |
| CaCl₂ | .045 |
| | 100.00 |

The rubber emulsion had the following composition:

| Component B | % by weight |
| --- | --- |
| Pliopave 165-K Latex (Solids) | 6.56 |
| Water (including H₂O from Latex | 92.60 |
| Duomeen T | .40 |
| Arquad S-50 | .26 |
| HCl | .11 |
| CaCl₂ | .07 |
| | 100.00 |

The mixed composition had the following total concentration of the several constituents:

| Mixed Composition | | % by weight |
| --- | --- | --- |
| Asphalt (Binder B) | 195 | 48.57 |
| Pliopave 165-K (solids) | 6.56 | 1.63 |
| Water | 197.60 | 49.10 |
| Duomeen T | 1.30 | .32 |
| Arquad S-50 | .86 | .21 |
| HCl | .41 | .12 |
| CaCl₂ | .22 | .05 |
| | 401.95 | 100.00 |

The mixed composition was applied to the dry base and side surfaces of an empty pond having a surface area of approximately 15,000 square feet. The composition was applied in approximately 8 gallons per 100 square feet of ground surface area. The soil particles were substantially impermeabilized although the penetration of the material was less than one and one half inch. After the materials had set, water was impounded in the pond during a 48 hour period and water loss tests were conducted. Inventory data was taken to determine the degree of water loss reduction. It was found that approximately 85 to 86 percent water loss reduction was achieved.

After the water loss reduction tests were terminated, the pond was drained. It was found that the surfaces of the bed and sides were covered with a continuous, non-tacky layer of asphaltic material, which was firm and resilient. The vertical sidewalls showed no signs of sliding or cracking and rocks and boulders were bound into the mass as well as the smaller particles. Examination of the pond surfaces showed that although the penetrations in some places were only one half inch, it was possible to walk upon the impermeabilized area without disturbing the surface or damaging it.

After a 3 month period the pond was drained and a second application of compositions (as described below) was made to the surface which had accumulated a coating of loose sand during the service period.

The first part of this second application consisted of spraying the following composition at a rate of 3.3 gallons per hundred square feet:

| | % by weight |
| --- | --- |
| Pliopave 165-K Latex (solids) | 6.56 |
| Water (including water from latex) | 91.60 |
| Duomeen T | .40 |
| Arquad S-50 | .26 |
| HCl | .11 |
| CaCl₂ | .07 |
| Nopcowet 160 | 1.00 |
| | 100.00 |

The second part of this second application consisted of spraying the following composition at a rate of 2.4 gallons per hundred square feet:

| | % by weight |
| --- | --- |
| Asphalt (Binder) | 48.57 |
| Pliopave 165-K (solids) | 1.63 |
| Water (including water from latex) | 47.60 |
| Duomeen T | 0.32 |
| Arquad S-50 | 0.21 |
| HCl | 0.12 |
| CaCl₂ | 0.05 |
| Nopcowet 160 | 1.50 |
| | 100.00 |

After cure the pond was filled with water and the water loss was measured over a period of time and it was found that the composition had reduced the water loss by 98.8%.

EXAMPLE III

An application of a composition applied by a method disclosed in parent application Ser. No. 457,969 was conducted in a second natural location in Pauma Valley, Calif. A large pond identified in Example X approximately 30 feet by 40 feet by 6 feet deep at the center (approximately 13,000 gallons capacity), was used for the test. The surfaces of the bed and the sides of the pond site were treated first with a solution of latex binder having the following composition:

| | % by weight |
| --- | --- |
| Pliopave 165-K Latex (solids) | 6.56 |
| Water (including H₂O from Latex) | 91.60 |
| Duomeen T | .40 |
| Arquad S-50 | .26 |
| HCl | .11 |
| CaCl₂ | .07 |
| Nopcowet 160 | 1.00 |
| | 100.00 |

The solution was applied at the rate of approximately one gallon per hundred square feet of surface. Thereafter the surfaces were treated with an emulsion sealer having the following composition:

| | % by weight |
| --- | --- |
| Asphalt (Binder B) | 48.57 |
| Pliopave 165-K (Solids) | 1.63 |
| Water | 47.60 |
| Duomeen T | .32 |
| Arquad S-50 | .21 |
| HCl | .12 |
| CaCl₂ | .05 |
| Nopcowet 160 | 1.50 |
| | 100.00 |

The solution was applied at the rate of approximately 3.3 gallons per hundred square feet of surface. Penetration of the virgin soil by both the latex solution and the final emulsion sealer was excellent. The latex solution was applied in approximately one gallon per hundred square feet of surface and the emulsion sealer in approximately 3.3 gallons per hundred square feet of surface. The sealing of approximately 2,300 square feet of surface area was completed in 90 minutes.

After cure, this pond was filled with water and the water loss was measured over a period of time and it was found that the treatment had reduced the water loss by 96.6%.

EXAMPLE IV

Tests were carried out to determine the efficacy of including minor amounts of various non-ionic surfactants in the compositions of parent application Ser. No. 457,969 to improve soil penetration and decrease soak-in time.

An emulsion having the mixed composition described in Example II and having in addition, 0.5 percent of surfactant, was used in concentrated form (52% asphalt solids) and in dilute form (26% asphalt solids), 50 ml. of each emulsion was applied to a 4 sq. in. $\times \frac{1}{2}$ deep area (confined in an aluminum form) set on the surface of the sand in an 8 $\times$ 8 $\times \frac{1}{2}$ deep disposable aluminum baking pan. Soak-in time and penetration data were recorded as set forth in the following Table II. It can be seen that best results are obtained with Nopcowet 160, an alkyl aryl polyether alcohol, Hyonic PE-90, a polyethoxylated nonylphenol, Triton CF-10, a benzylether of octylphenol-ethylene oxide adduct of Tergitol TMN or 15-S-7, a linear alcohol.

TABLE II

| Emulsion | % Solids (by weight) | Surfactant |
|---|---|---|
| Control | 52 | None |
| Control' | 26 | None |
| 1 | 52 | Hyonic PE90 (polyethoxylated Nonylphenol) |
| 1' | 26 | " |
| 2 | 52 | Lomar D (polymerized Naphthalene Sulfonate |
| 2' | 26 | " |
| 3 | 52 | Lomar PW Sodium Neutralized (Naphthalene Sulfonic Acid) |
| 3' | 26 | " |
| 4 | 52 | Nopcowet 160 (alkyl aryl polyether alcohol) |
| 4' | 26 | " |
| 5 | 52 | Nopcowet 1529 |
| 5' | 26 | " |
| 6 | 52 | Tergitol TMN (Trimethyl Nonanol) |
| 6' | 26 | " |
| 7 | 52 | Tergitol 15-S-7 (Linear Alcohol) |
| 7' | 26 | Tergitol 15-S-7 (Linear Alcohol) |
| 8 | 52 | Silicone Y-4186 (Silicone) |
| 8' | 26 | " |
| 9 | 52 | Triton CF-10 (Benzylether of octylphenol-ethylene oxide |
| 9' | 26 | " |
| 10 | 52 | Triton X-100 (Octyl phenoxy ethanol) |
| 10' | 26 | " |
| 11 | 52 | Triton X-114 (Octyl phenoxy polyethoxy ethanol) |
| 11' | 26 | " |
| 12 | 52 | Triton X-400 (Stearyl dimethylbenzyl - ammonium chloride + stearyl and isopropyl alcohols) |
| 12' | 26 | " |

TABLE II-continued

| Emulsion | Soak-In Time (If Rapid) | Depth of Penetration |
|---|---|---|
| Control | — | None |
| Control' | 60 min. | $\frac{1}{4}''$ |
| 1 | 180 min. | $\frac{1}{4}''$ |
| 1' | 360 min. | $\frac{1}{4}''$ |
| 2 | — | None |
| 2' | — | None |
| 3 | — | None |
| 3' | — | None |
| 4 | 180 min. | $\frac{1}{4}''$ |
| 4' | 8 min. | 1'' |
| 5 | — | None |
| 5' | 60 min. | $\frac{1}{4}''-1''$ |
| 6 | — | None |
| 6' | 5 min. | $\frac{1}{4}''-1\frac{1}{2}''$ |
| 7 | — | None |
| 7' | 360 min. | $\frac{1}{4}''-1\frac{1}{2}''$ |
| 8 | — | None |
| 8' | 360 min. | $\frac{1}{4}''-1''$ |
| 9 | — | None |
| 9' | >360 min. | $\frac{1}{4}''$ |
| 10 | — | None |
| 10' | >360 min. | $\frac{1}{4}''-\frac{1}{2}''$ |
| 11 | — | None |
| 11' | 32 min. | $\frac{1}{4}''-\frac{1}{2}''$ |
| 12 | — | None |
| 12' | >360 min. | $\frac{1}{4}''-\frac{1}{2}''$ |

EXAMPLE V

Several compositions of the emulsions of this invention were prepared. The compositions were poured onto the surface of sand in a 6 inch diameter, open-ended, transparent, plexiglass cylinder. The sand had a depth of 6 inches and was supported by a metal screen. The surface, after application of the emulsion, was flooded with a quantity of water and the assembly allowed to remain undisturbed for one week. Physical conditions of each, subsurface film formation, and water loss reduction were then observed. The composition in TABLE III below was applied to the surface of the sand in the cylinder and after 5 minutes, 400 milliliters of water were applied and immediately thereafter, another 200 milliliters were applied. The cylinder was examined after one week. An asphalt film layer had been formed at the five inch depth level, and the top layer of sand was clear of asphalt and loose.

TABLE III

| Composition | Weight (grams) | Percent |
|---|---|---|
| Asphalt | 122.40 | 29.1 |
| Water | 282.00 | 67.1 |
| Polyethoxylated nonylphenol (PE-90) | 15.38 | 3.6 |
| N- alkyl quaternary ammonium compound (ARQUAD S-50) | 0.62 | 0.2 |
| TOTAL | 420.40 | 100 |

EXAMPLE VI

The composition was applied to the surface of sand in a plexiglass cylinder and, immediately thereafter, 30 milliliters of water applied. The assembly was observed after one week. An asphaltic layer was formed approximately 4 inches below the surface. The top soil layer was loose and essentially free of asphalt.

TABLE IV

| Composition | Grams | Percent |
|---|---|---|
| Asphalt | 122.40 grams | 39.3 |
| Water | 165.00 grams | 52.9 |
| Polyethoxylated nonylphenol | 13.38 grams | 4.3 |
| N-alkyl quaternary ammonium compound | 0.87 grams | 0.3 |
| Methyl alcohol | 10.00 grams | 3.2 |

TABLE IV-continued

| Composition | Grams | Percent |
|---|---|---|
| TOTAL | 311.65 | 100 |

EXAMPLE VII

A bed of soil, 5 feet by 2 feet, was prepared on the dry bed of the course of the San Luis Rey River near Pala, Calif. The composition in TABLE V below was applied, by pouring, onto this surface. Immediately thereafter, the surface was flooded evenly with 7500 grams of water. Seven days later, the area was examined. The top layer was loose and appeared to be natural soil. Probing below the surface, a firm and solid layer of asphalt/sand was found at about 5 inches below the surface.

TABLE V

| Composition | Grams | Percent |
|---|---|---|
| Asphalt | 2336 grams | 41.61 |
| Water | 2838 grams | 50.55 |
| Polyethoxylated nonylphenol | 263 grams | 4.68 |
| N- alkyl quaternary ammonium compound | 17.2 grams | 0.31 |
| Methyl alcohol | 160 grams | 2.85 |
| TOTAL | 5614.2 | 100 |

What is claimed is:

1. A process for creating a semi-permeable, subsurface barrier for reducing the loss of water by seepage through permeable soils comprising the steps of: applying to the surface of said soils, a composition comprising:
    a. a 15 to 50% weight aqueous, cationic emulsion of a petroleum asphalt having a softening point of 90° to 200° F. and a penetration at 77° F. of from 4 dmm to 205 dmm, ninety percent of the particles of asphalt being less than about 10 microns in size;
    b. a cationic emulsifier in from 0.15 to 0.75 percent by weight of said emulsion;
    c. a non-ionic surface active agent in from 3.0 to 7.5 percent by weight of said emulsion selected from the group consisting of alkyl aryl polyether alcohols, polyethoxylated nonylphenols (average ethylene oxide content of 4-12 mols per mol of nonylphenol), benzyl ethers of octyl phenol and linear organic alcohols;
    d. from 1.0 to 10.0 percent by weight of said emulsion of an elastomeric material; and
    e. an acid in sufficient quantity to set the pH of said composition at from 3 to 7, and thereafter flooding said surface with water to force said emulsion downward into said soil to form a tough, flexible water-impervious mass below said surface.

2. A process as recited in claim 1 wherein said surface is flooded with from 10 to 40 gallons of water per 100 square feet.

3. A process as recited in claim 1 wherein the surface layer of said soil is first wetted with water to activate the surfaces of the materials therein and then penetrated with said composition.

4. A process as recited in claim 1 wherein the surface layer of said soil is first wetted with water containing said non-ionic surface active agent in an amount sufficient to wet the surface of the particles in said surface layer and then penetrated with said composition.

5. A process as recited in claim 3 wherein the solution used to pre-wet said surface layer contains from 1% to 10% by weight of an emulsion of said elastomeric material.

* * * * *

UNITED STATES PATENT OFFICE
CERTIFICATE OF CORRECTION

Patent No. 4,041,712     Dated August 16, 1977

Inventor(s) George Stepien, Jr. et al

It is certified that error appears in the above-identified patent and that said Letters Patent are hereby corrected as shown below:

Column 2, line 65, "0.5%" should read --1.5%--. Column 9, line 9 of third table, remove "893(50%)" from column H-1a and place immediately following "Ucar Latex". Column 10, third table, next to last line,".00166" should be in Column H-9, and ".000086" should be in Column H-10. Column 13, line 25, 1/2 should read --1/2"--; line 27, "8 x 8 x 1/2" should read --8" x 8" x 1 1/2"--.

Signed and Sealed this

Fifteenth Day of November 1977

[SEAL]

Attest:

RUTH C. MASON
Attesting Officer

LUTRELLE F. PARKER
Acting Commissioner of Patents and Trademarks